United States Patent [19]
Sakaguchi et al.

[11] Patent Number: 5,485,549
[45] Date of Patent: Jan. 16, 1996

[54] METHOD AND SYSTEM FOR A PRODUCTION SYSTEM

[75] Inventors: Seiji Sakaguchi, Yokohama; Hiroshi Koike, Machida; Hiroshi Tomita, Yokohama, all of Japan

[73] Assignee: Hitachi, Ltd., Tokyo, Japan

[21] Appl. No.: 36,183

[22] Filed: Mar. 23, 1993

[30] Foreign Application Priority Data

Mar. 26, 1992 [JP] Japan ................................. 4-068095

[51] Int. Cl.[6] .................................................. G06F 9/44
[52] U.S. Cl. ................................. 395/51; 395/64; 395/52
[58] Field of Search ................................. 395/64, 52, 51

[56] References Cited

U.S. PATENT DOCUMENTS

| | | | |
|---|---|---|---|
| 4,959,799 | 9/1990 | Yoshiura et al. | 395/54 |
| 4,989,162 | 1/1991 | Tanaka et al. | 395/51 |
| 5,027,305 | 6/1991 | Tanaka et al. | 395/51 |
| 5,197,116 | 3/1993 | Katoh et al. | 395/51 |

OTHER PUBLICATIONS

Fayyad, et al, "Learning Control Information In Rule–Based Systems: A Weak Method," Artificial Intelligence Applications, 1988, 188–193.

Dong, et al, "A Skill Refinement Learning Model IEEE Expert", Apr. 1990, 15–28.

Sanborn, J. C., "Coping With Control in Rule–based Programs," The J. of Knowledge Engineering, Spring 1990, 50–58.

Tambe, Milind, et al. "Eliminating Expensive Chunks by Restricting Expressiveness," IJCAI–89, vol. 1, pp. 731–737, (English) 1989.

Miranker, Daniel P. "Treat: A Better Match Algorithm for AI Production Systems," AAAI–87, vol. 1, pp. 42–47, (English) 1987.

Forgy, Charles L. "Rete: A Fast Algorithm for the Many Pattern/Many Object Pattern Match Problem*," Artificial Intelligence, vol. 19, 1982, pp. 17–37. (English).

*Primary Examiner*—Robert W. Downs
*Attorney, Agent, or Firm*—Fay, Sharpe, Beall, Fagan, Minnich & McKee

[57] ABSTRACT

Actual data which is satisfied by a condition string which can be judged within actual data is stored in each α memory, and combined actual data is generated from each of the α memories by a combined actual data generator, and the inter-actual data condition of the generated combined actual data is evaluated by an inter-data condition evaluation for actual data so as to specify an instance with no conflict resolution process being performed and to reduce the memory capacity necessary for the evaluation process by a production system.

9 Claims, 14 Drawing Sheets

```
STRATAGY{R, SC}                                          ——— 301
   (RULE1
      if          (?x  @slot=1)
                  (?y  @slot<0)
      then        (?x. slot:=2)
   )

(RULE2
      if          ......
      then        ......
   )

......
```

FIG. 6
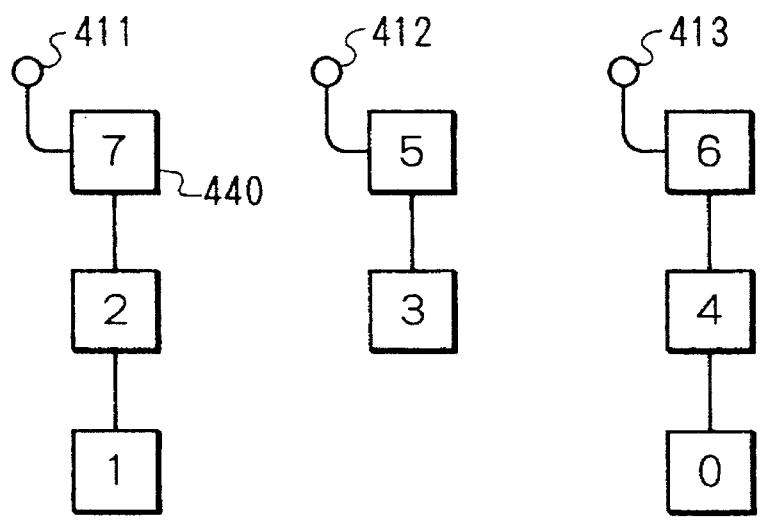
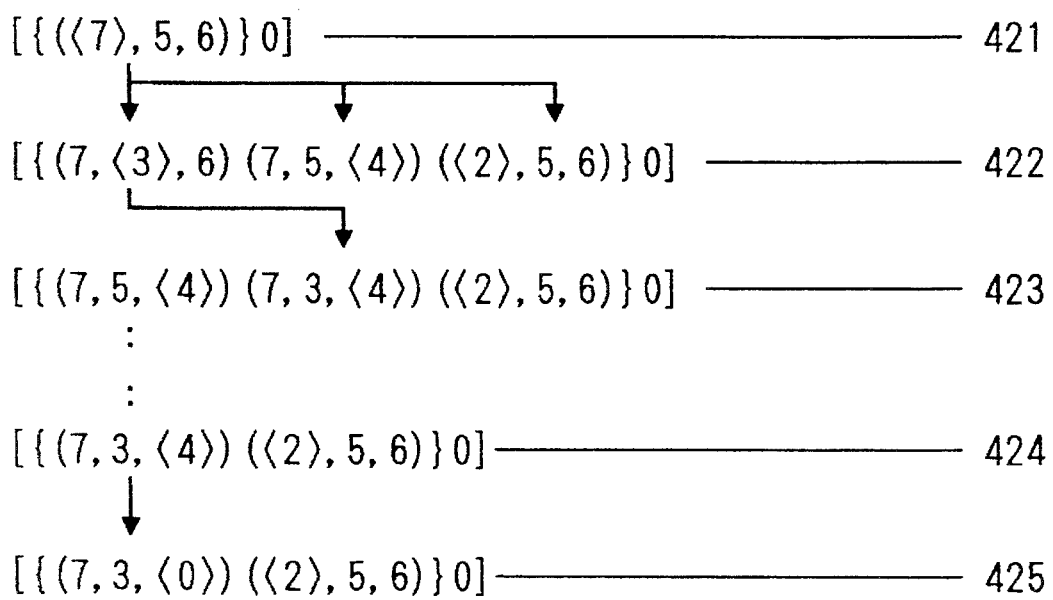

[{(7, 3, ⟨0⟩) (⟨2⟩, 5, 6)} 0] ——————— 425

[{(⟨10⟩, 5, 9)} 1 {(7, 3, ⟨0⟩) (⟨2⟩, 5, 6)} 0] ——————— 431

[{(10, ⟨3⟩, 9) (10, 5, ⟨8⟩) (⟨7⟩, 5, 9)} 1
{(7, 3, ⟨0⟩) (⟨2⟩, 5, 6)} 0] ——————— 432
⋮
[{(1, 3, ⟨8⟩)} 1 {7, 3, ⟨0⟩) (⟨2⟩, 5, 6)} 0]

[{(7, 3, ⟨0⟩) (⟨2⟩, 5, 6)} 0] ——————— 425
⋮
[{(1, 3, ⟨0⟩)} 0]

ACTUAL DATA

MEMORY CELL FOR SATISFIED INFORMATION OF INTRA-DATA CONDITION FOR ACTUAL DATA

METHOD AND SYSTEM FOR A PRODUCTION SYSTEM

BACKGROUND OF THE INVENTION

1. Field of the Invention

The present invention relates to a production system which is used for an expert system and more particularly to a method and system of a production system for performing high speed inference by the conflict resolution strategy designation method, the high speed inference method on the basis of the conflict resolution strategy, or the high inference method.

2. Description of the Prior Art

An expert system allows a computer in which expert knowledge is incorporated to make high level judgment and work which are generally carried out by an expert. A production system has been developed as an effective tool for constructing this expert system.

Knowledge which is used by the production system includes a rule in the "if condition then conclusion" format consisting of the condition and conclusion which express expert knowledge and actual data which expresses facts and conditions and they are stored and inferred in the rule base and actual database.

The inference engine of the production system infers by the syllogism by applying the condition evaluation process, conflict resolution process, and conclusion evaluation process repeatedly for each rule in the rule base and each actual data in the actual database. The condition evaluation process evaluates the condition of each rule in the rule base and each actual data in the actual database (called condition evaluation) and obtains all sets (instances) of rules in which the conditions are satisfied and of actual data which satisfy the conditions so as to generate a conflict set (a set of instances). The conflict resolution process selects an instance from the conflict set on the basis of the conflict resolution strategy which is an evaluation standard. The conclusion evaluation process executes the conclusion described in the rule of the selected instance. According to the conventional production system, a conflict resolution strategy is selected from a plurality of strategies which are provided beforehand. Therefore, the selection degree of freedom of a user is limited.

As to the high speed technique of inference in the production system, an evaluation method relating to a conflict resolution strategy where the rule description order is the priority order is indicated, for example, in SIG-ARC, 89-ARC-75, 75-3 (1989); Information Processing Society of Japan. By this method, the number of comparisons of rule conditions and actual data for designation of an instance is reduced. However, since histories of instance candidates which are checked already are used, a lot of memories for storing histories and a lot of time for searching for histories are required. As to selection of a conflict resolution strategy, the aforementioned method is used.

According to the above prior art, the condition evaluation process of the production system saves the combination [page 3] status (candidate histories) of rules which are already checked and actual data and avoids double check using it. Therefore, although the number of item checks of the condition evaluation process is reduced, a lot of time and memories are required for the processing for avoiding double check.

Since the degree of freedom of strategies which can be designated by a user is limited, the last instance cannot be specified often.

SUMMARY OF THE INVENTION

An object of the present invention is to provide a high speed inference method on the basis of the conflict resolution strategy for generating combinations of rules and actual data by reducing the storage capacity for storing histories of instance candidates.

Another object of the present invention is to provide an expert system which is generated by using a production system which uses the high speed inference method on the basis of the above conflict evaluation strategy and a method thereof.

A further object of the present invention is to provide a production system for improving the degree of freedom of designation of a conflict resolution strategy by a user and a method thereof. To accomplish the above objects, the present invention has a rule base for storing rules consisting of the condition and conclusion, an actual database for storing facts, and an inference engine, and the inference engine evaluates facts in the above actual database and the conditions of rules in the rule base using the above processor, selects a combination for at least one rule on the basis of at least one conflict resolution strategy from a plurality of combinations of the above evaluated facts and rules by the above processor, and executes the conclusion of the selected one combination of rule.

More concretely, the objects of the present invention are accomplished by installing a candidate generation means for generating combinations of rules, which have a great possibility of selection by the conflict resolution process, and actual data by an associated list and generating rules, for which the condition evaluation process is performed in the generation order, and actual data and a condition evaluation end means for performing the condition evaluation process for generated combinations and ending the condition process immediately after the condition is satisfied. When at least one basic strategy is prepared and a user combines them freely, the degree of freedom of designation of a conflict resolution strategy of a user is improved and the last instance can be specified according to the intention of a user. To avoid a situation such that an instance cannot be specified by the strategy which is designated by a user, a strategy for specifying an instance is added as a system default strategy immediately after the user designates the strategy.

By doing this, the present invention has the following operation and function. According to the present invention, the condition evaluation process which requires a lot of time conventionally because it obtains all possible instances can be performed by obtaining only a minimum amount of instances depending on the designated conflict resolution strategy type, so that the load of the condition evaluation process can be lightened. Since at least one basic strategy is prepared and a combination of them can be designated, the situation that the last instance cannot be specified by a user conventionally can be avoided.

The foregoing and other objects, advantages, manner of operation and novel features of the present invention will be understood from the following detailed description when read in connection with the accompanying drawings.

BRIEF DESCRIPTION OF THE DRAWINGS

FIG. 6 is a state diagram at initial generation of the combined actual data generator shown in FIG. 4.

DETAILED DESCRIPTION OF THE PREFERRED EMBODIMENTS

Next, the embodiments of the present invention will be explained in detail with reference to the accompanying drawings.

Figure 19:
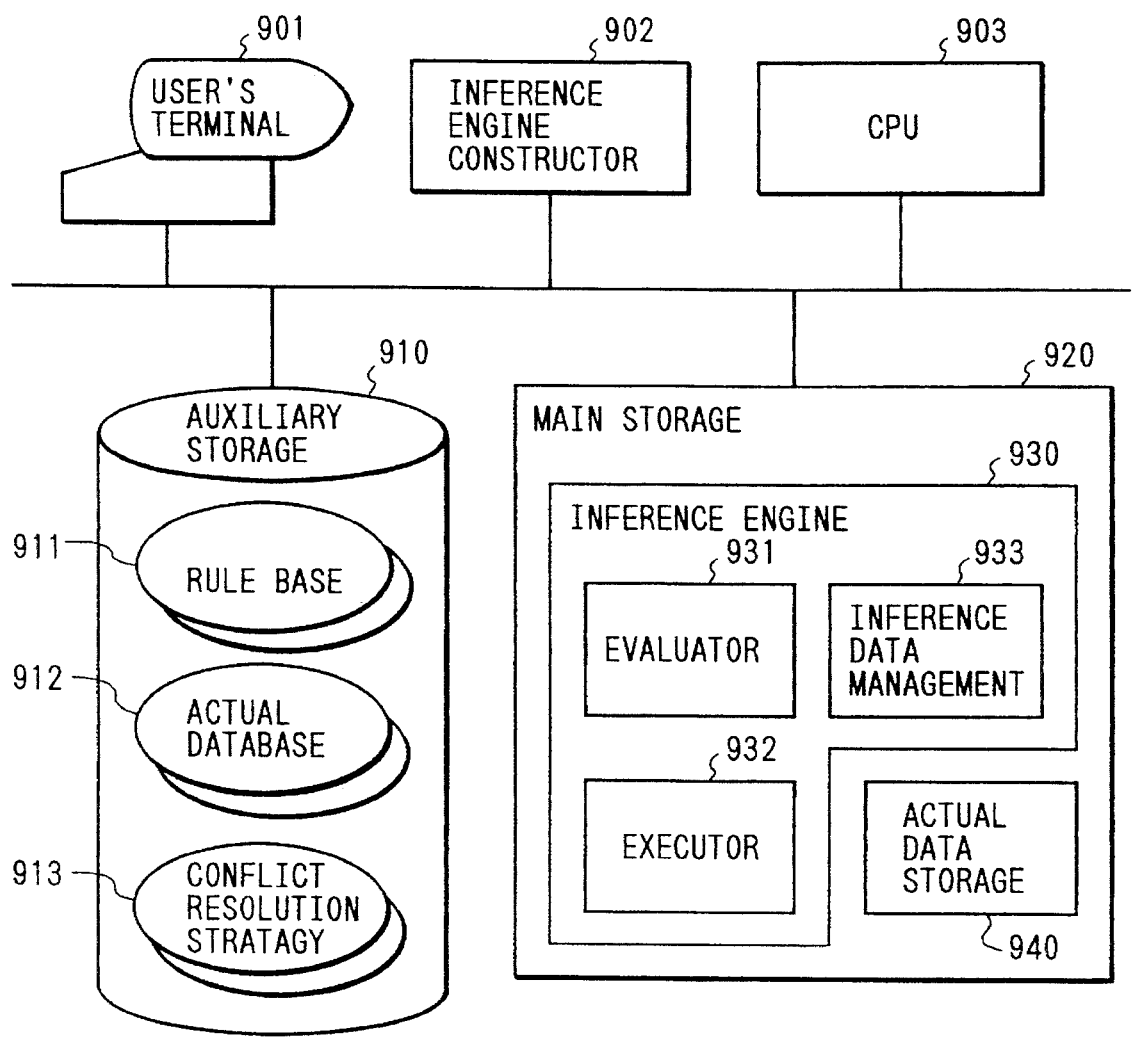
FIG. 19 shows the system configuration of an embodiment when the present invention is realized on a computer.

FIG. 19 shows the system configuration of an embodiment when the present invention is realized on a computer. An inference engine constructor 902 fetches information necessary for inference from a rule base 911, actual database 912, and conflict resolution strategy 913 which are stored in an auxiliary storage 910 by a CPU 903 according to an instruction from a user's terminal 901 and constructs an inference engine 930 and actual data storage 940 on a main storage 920. An evaluator 931 of the inference engine 930 is constructed from the rule base 911 and conflict resolution strategy 913 and an executor 932 is constructed from the rule base 911. An inference data management 933 is constructed by the inference engine constructor 902. An inference is executed by allowing the CPU to execute the constructed inference engine 930 according to an instruction of the user's terminal 901. The present invention can be realized by program processing by such a computer system as mentioned above and the function blocks shown in the following embodiments can be realized by using a dedicated microprocessor and LSI which are incorporated for realizing the functions. A dedicated computer or microcomputer can be used properly for a plurality of related function blocks according to the request performance. Next, the function configuration will be described in detail.

When there are a plurality of instances, that is, combinations of rules and actual data which satisfy the rules, a set of these combinations is called a conflict set. The production system advances an inference by selecting an instance from this conflict set, that is, specifying an instance and executing the conclusion of the rule which belongs to the instance.

The production system of the present invention prepares at least one basic strategy as strategies and provides conflict resolution strategies with high degree of freedom according to the intention of a user so that he can freely select and link at least one conflict resolution strategy from the provided strategies like a first strategy and second strategy.

To avoid a case such that an instance cannot be specified only by the strategy which is designated by a user, the system default conflict resolution strategy which is prepared by the system beforehand is added so that an instance can be specified surely. Furthermore, conflict resolution strategies are optimized by removing a redundant strategy which is generated by the conflict resolution strategy string designated by the user and the system default conflict resolution strategy.

In this embodiment, the conflict resolution strategy designation method and optimization thereof will be explained for the following 10 types of basic strategies among conflict resolution strategies which are instance selection standards.

(1) Ordering latest strategy: OR strategy

Actual data contained in an instance can be ordered in correspondence with the order described by the rule. The ordering latest strategy is a strategy for comparing the update time of the first actual data in each instance, judging new actual data as data with high priority, and selecting an instance containing actual data with high priority. When the priority is equal, the ordering latest strategy compares actual data with the second priority, third priority, and so on one by one so as to judge superiority or inferiority. However, the priority when actual data to be compared is exhausted in at least one instance is handled as equal and no instance can be specified.

(2) Latest strategy: R strategy

Actual data contained in an instance can be ordered in correspondence with the reverse order of the updating order. The latest strategy is a strategy for comparing the update time of actual data whose update time is newest among the actual data belonging to each instance, judging new actual data as data with high priority, and selecting an instance containing actual data with high priority. When the priority is equal, the latest strategy compares actual data with the second priority, third priority, and so on one by one so as to judge superiority or inferiority. However, the priority when actual data to be compared is exhausted in at least one instance is handled as equal and no instance can be specified.

(3) Rule description order strategy: RO strategy

Satisfied rules contained in an instance can be ordered in correspondence with the rule description order. The rule description order strategy is a strategy for judging that as a rule contained in each instance is described earlier, the priority thereof is higher and selecting an instance containing rules with high priority. However, the priority when a plurality of instances which satisfy the same rule exist is handled as equal and no instance can be specified.

(4) Detailing strategy: SC strategy

Satisfied rules contained in an instance can be ordered in correspondence with the descending order of the number of rule conditions. The detailing strategy is a strategy for judging that as the number of conditions of a rule contained in each instance increases, the priority thereof is high and selecting an instance containing rules with high priority. However, the priority of an instance containing a rule having the same number of conditions is handled as equal and no instance can be specified.

(5) Certainty strategy: C strategy

Satisfied rules contained in an instance can be ordered in correspondence with the magnitude of a numerical value added to each rule. The certainty strategy is a strategy for judging that as the numerical value added to a rule contained in each instance increases, the priority thereof is high and selecting an instance containing rules with high priority. However, the priority of an instance containing a rule having the same numerical value added is handled as equal and no instance can be specified.

(6) Ordering inverse latest strategy: IOR strategy

Actual data contained in an instance can be ordered in correspondence with the order described by the rule. The ordering inverse latest strategy is a strategy for comparing the update time of the first actual data in each instance, judging old actual data as data with high priority, and selecting an instance containing actual data with high priority. When the priority is equal, the ordering inverse latest strategy compares actual data with the second priority, third priority, and so on one by one so as to judge superiority or inferiority. However, the priority when actual data to be compared is exhausted in at least one instance is handled as equal and no instance can be specified.

(7) Inverse latest strategy: IR strategy

Actual data contained in an instance can be ordered in correspondence with the updating order. The inverse latest strategy is a strategy for comparing the update time of actual data whose update time is oldest among the actual data belonging to each instance, judging old actual data as data with high priority, and selecting an instance containing actual data with high priority. When the priority is equal, the inverse latest strategy compares actual data with the second priority, third priority, and so on one by one so as to judge superiority or inferiority. However, the priority when actual data to be compared is exhausted in at least one instance is handled as equal and no instance can be specified.

(8) Inverse rule description order strategy: IRO strategy

Satisfied rules contained in an instance can be ordered in correspondence with the rule description order. The inverse rule description order strategy is a strategy for judging that as a rule contained in each instance is described later, the priority thereof is higher and selecting an instance containing rules with high priority. However, the priority when a plurality of instances which satisfy the same rule exist is handled as equal and no instance can be specified.

(9) Inverse detailing strategy: ISC strategy

Satisfied rules contained in an instance can be ordered in correspondence with the ascending order of the number of rule conditions. The inverse detailing strategy is a strategy for judging that as the number of conditions of a rule contained in each instance decreases, the priority thereof is high and selecting an instance containing rules with high priority. However, the priority of an instance containing a rule having the same number of conditions is handled as equal and no instance can be specified.

(10) Inverse certainty strategy: IC strategy

Satisfied rules contained in an instance can be ordered in correspondence with the smallness of a numerical value added to each rule. The inverse certainty strategy is a strategy for judging that as the numerical value added to a rule contained in each instance decreases, the priority thereof is high and selecting an instance containing rules with high priority. However, the priority of an instance containing a rule having the same numerical value added is handled as equal and no instance can be specified.

Figures 3, 4:
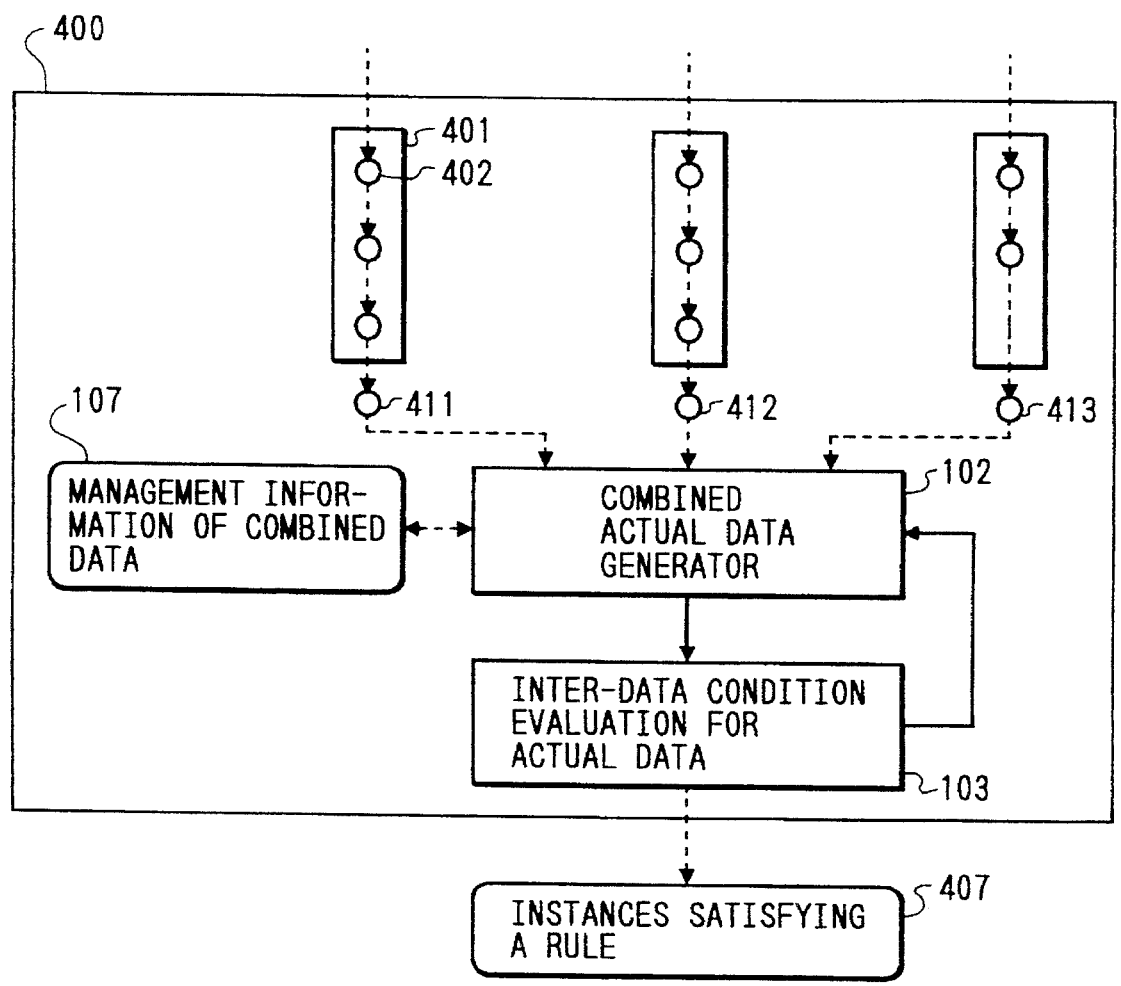
FIG. 3 is a drawing of a designation example of a conflict resolution strategy.
FIG. 4 is a block diagram of the condition evaluation of a rule.

FIG. 3 shows an example of rule description of this embodiment. A user lines at least 0 conflict resolution basic strategy up so as to describe as shown in 301. In this case, the {OR, RO} strategy which is a system default conflict resolution strategy of this embodiment is automatically added immediately behind the user designation strategy. Next, the preprocessing before substance processing will be explained.

DETAILED DESCRIPTION OF THE PREFERRED EMBODIMENTS

Figure 12:
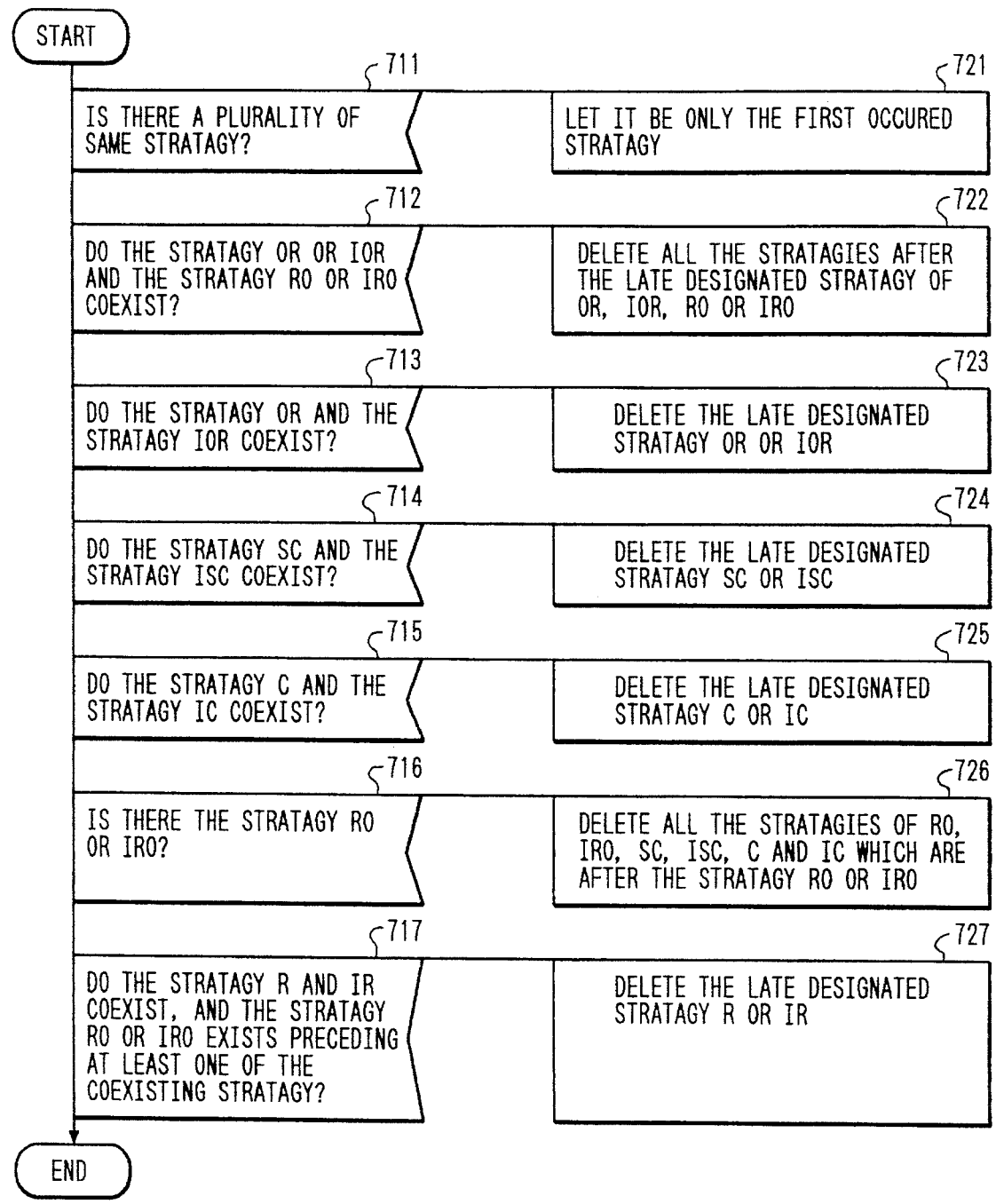
FIG. 12 is a flow chart of conflict resolution strategy optimization.

A redundant strategy which is generated by the user designation strategy of this embodiment and system default strategy added will be an optimized conflict resolution strategy when the following steps {A1} to {A7} which are shown in FIG. 12 are applied one by one.

{A1} When there are a plurality of same strategies (711), the second and subsequent strategies are all deleted (721).

{A2} When the strategy OR (or IOR) and the strategy RO (or IRO) coexist (712), the strategies behind the above strategy which is designated later are all deleted (722).

{A3} The strategies OR and IOR behind the strategy OR (or IOR) are all deleted (713, 723).

{A4} The strategies SC and ISC behind the strategy SC (or ISC) are all deleted (714, 724).

{A5} The strategies C and IC behind the strategy C (or IC) are all deleted (715, 725).

{A6} The strategies RO, SC, C, IRO, ISC, and IC behind the strategy RO (or IRO) are all deleted (716, 726).

{A7} When the strategies R and IR coexist and the strategy RO (or IRO) exists before at least one of the coexisting strategies, the strategy R or IR which exists behind the strategy RO (or IRO) is deleted (717, 727).

According to this embodiment, the degree of freedom of conflict resolution strategies which can be designated by a user can be improved and the efficiency of the conflict resolution process can be increased by cutting a redundant strategy.

Next, the conflict resolution processing method for splitting and managing a conflict set will be described in detail.

The production system of the present invention performs the conflict resolution process stepwisely by splitting and managing a conflict set.

In this embodiment, the conflict resolution processing method for performing the conflict resolution process stepwisely such as the intra-rule conflict resolution and inter-rule conflict resolution by splitting and managing a conflict set for each rule using the conflict resolution strategy and optimized conflict resolution strategy will be explained.

{Preprocessing 2-1}

Figure 13:
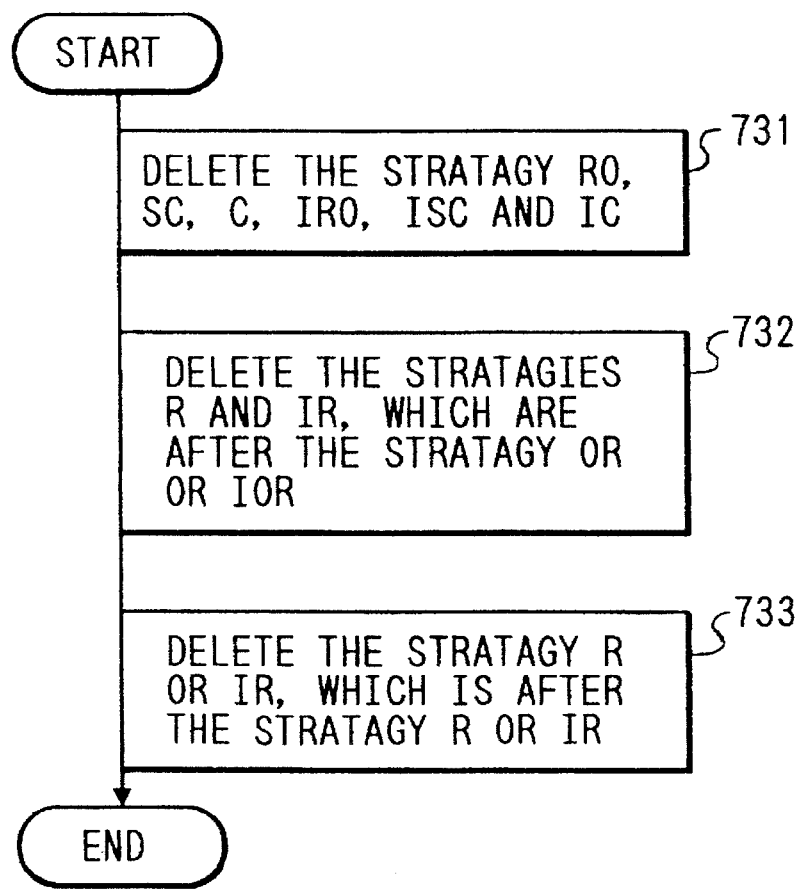
FIG. 13 is a flow chart of intra-rule conflict resolution strategy extraction.

The intra-rule conflict resolution strategy is obtained from the optimized conflict resolution strategy according to the steps {B1} to {B3} which are shown in FIG. 13.

{B1} The strategies RO, SC, C, IRO, ISC, and IC are all deleted (731).

{B2} The strategies R and IR behind the strategy 0R (or IOR) are all deleted (732).

{B3} The strategies R and IR behind the strategy R (or IR) which appears first are all deleted (733).

{Preprocessing 2-2}

Figure 14:
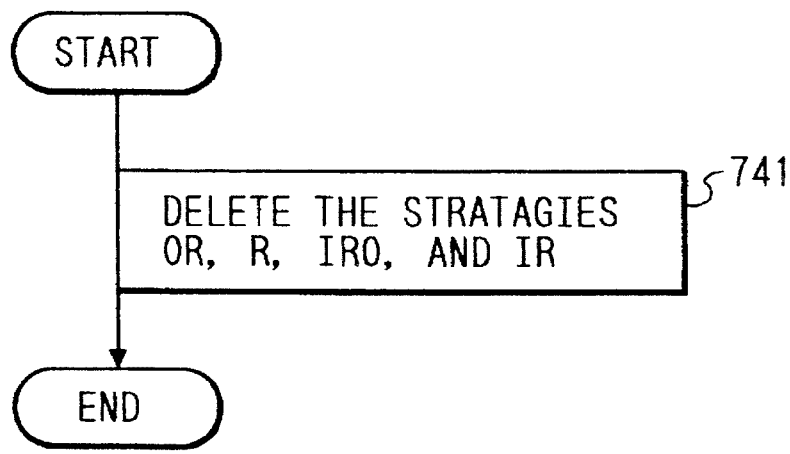
FIG. 14 is a flow chart of inter-rule conflict resolution strategy extraction.

The rules are lined up in the priority order according to a strategy that the optimized conflict resolution strategy is obtained according to the step {C1} which is shown in FIG. 14.

{C1} The strategies OR, R, IOR, and IR are all deleted (741).

Next, the substrate process of this embodiment will be explained.

Figure 5:
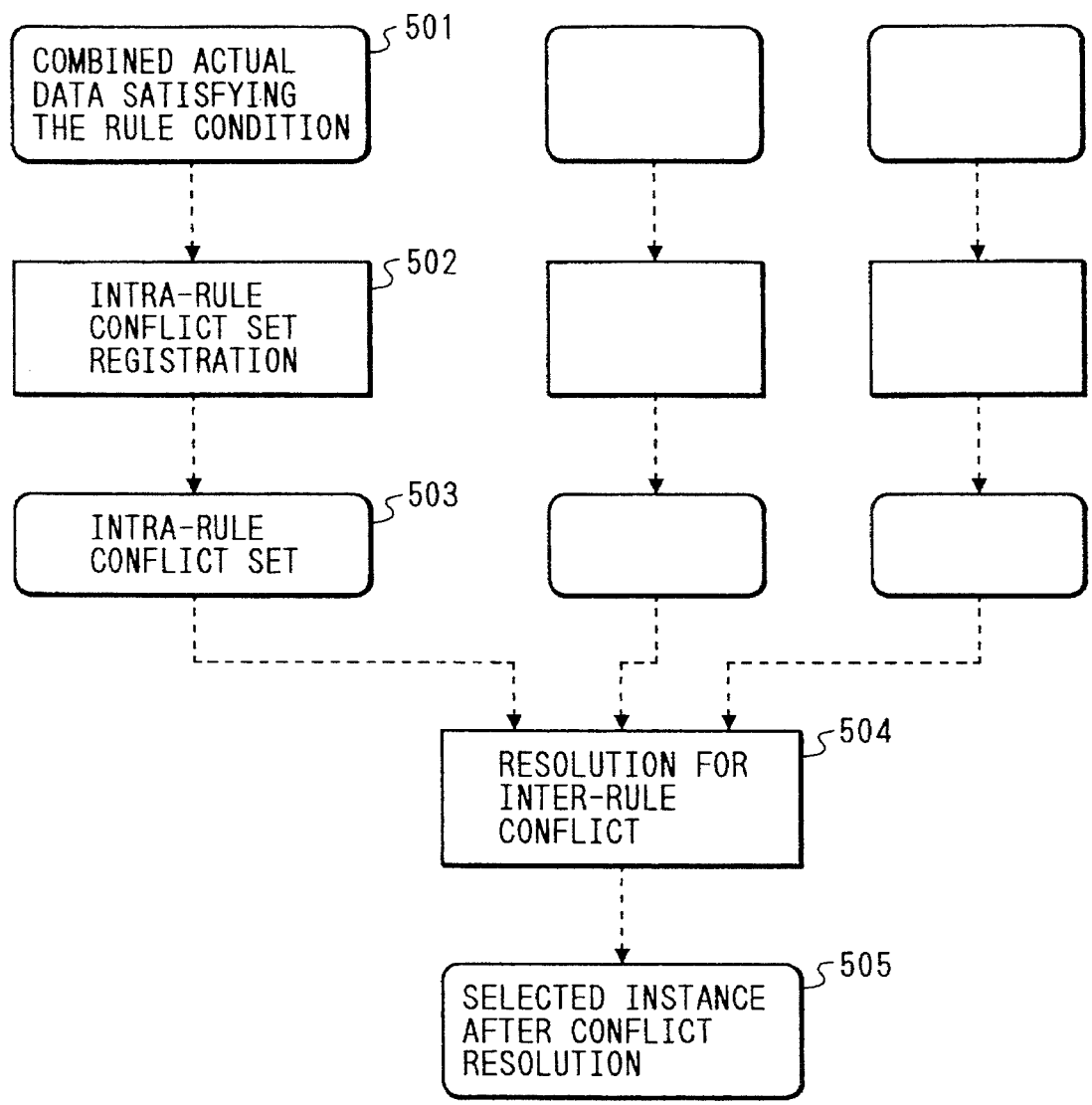
FIG. 5 is a block diagram of the stepwise conflict resolution process of the present invention.

This embodiment will be explained with reference to FIG. 5. Each rule is stored in an intra-rule conflict set 503 in the priority order by an intra-rule conflict set registration 502 wherein combined actual data satisfying the rule condition 501 is obtained by {Preprocessing 2-1}. By this process, the first element of the intra-rule conflict set is an instance representing the rule, that is, a rule instance candidate. As to inter-rule conflict resolution, two rule instance candidates are judged on superiority or inferiority by a conflict resolution strategy 504 which is optimized by Embodiment 1 in the rule order which is specified by {Preprocessing 2-2}, and the candidate with high priority is selected as an instance candidate and judged on superiority or inferiority against the rule instance candidate of the next rule. This processing is repeated continuously and the instance candidate which remains finally is an instance after conflict resolution.

According to this embodiment, the number of combinations of conflict sets to be compared is reduced and the efficiency of the conflict resolution process can be improved.

Next, the evaluation processing method on the basis of a conflict resolution strategy which is composed of one rule will be explained in detail.

In this embodiment, the evaluation processing method for obtaining an instance, which is selected by the conflict resolution strategy using the conflict resolution strategy and optimized conflict resolution strategy, with no conflict set being used will be explained.

Figure 2:
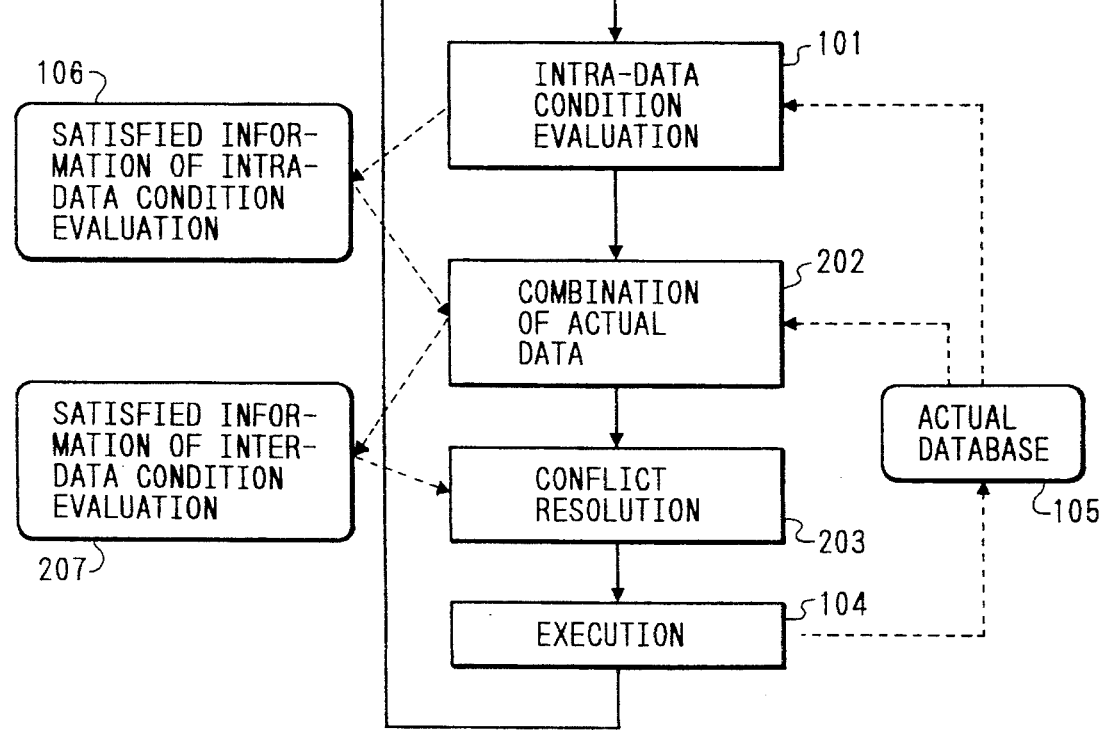
FIG. 2 is a drawing of an inference cycle having a conflict resolution.

FIG. 2 shows the conventional inference cycle. Actual data is stored in an actual database 105 and actual data which is satisfied by an intra-data condition evaluation for actual data 101 is stored in satisfied information of intra-data condition evaluation 106. Actual data information stored in the satisfied information of intra-data condition evaluation 106 is checked for the condition by an inter-data condition evaluation for actual data 202, and information of all the satisfied combinations of actual data is stored in satisfied information of inter-data condition evaluation 207, and an instance is selected from the satisfied information of inter-data condition evaluation 207, that is, so-called conflict set by a conflict resolution 203, and the conclusion of the rule is executed by an execution 104 so as to advance an inference.

Figure 1:
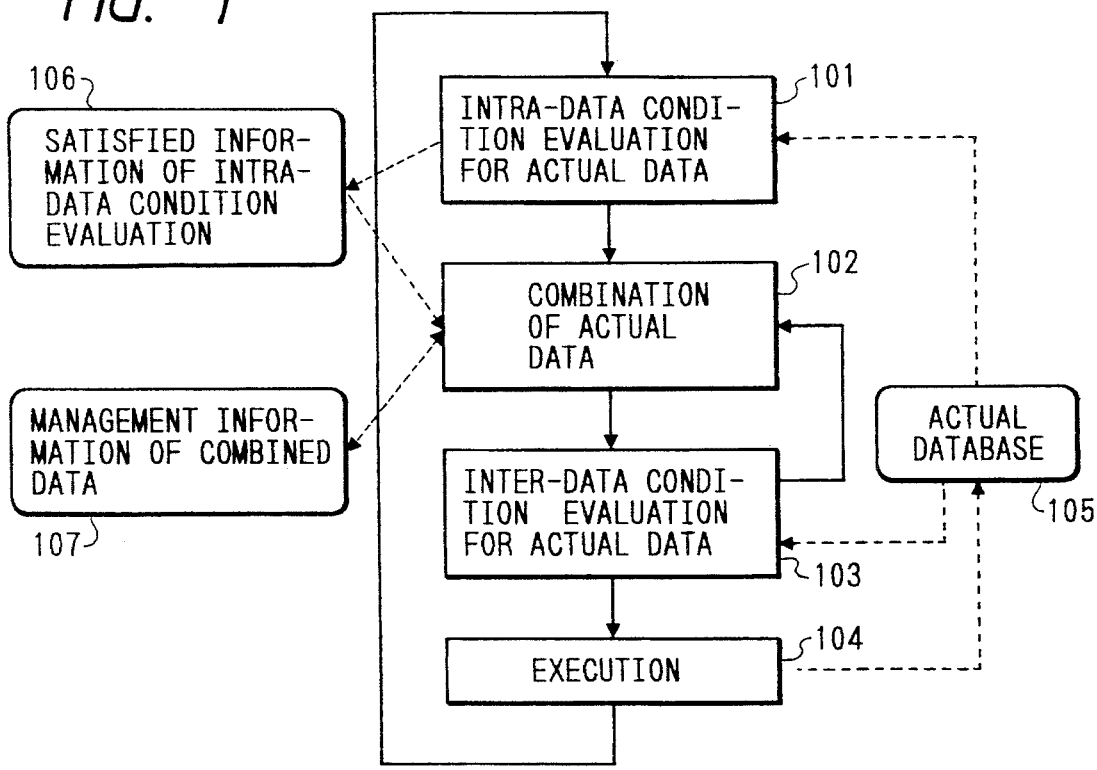
FIG. 1 is a drawing of an inference cycle having no conflict resolution.

FIG. 1 shows the inference cycle of this embodiment. Actual data is stored in an actual database 105 and actual data which is satisfied by an intra-data condition evaluation for actual data 101 is stored in satisfied information of intra-data condition evaluation 106. Actual data information stored in the satisfied information of intra-data condition evaluation 106 is combined by a combination of actual data 102 on the basis of management information of combined data 107 in the conflict resolution strategy priority order, and combined data which is satisfied when an inter-data condition evaluation for actual data 103 executes the inter-data condition evaluation for actual data is an instance to be obtained, and the conclusion of the rule is executed by an execution 104 without all the conflict sets being obtained so as to advance an inference.

Figure 10:
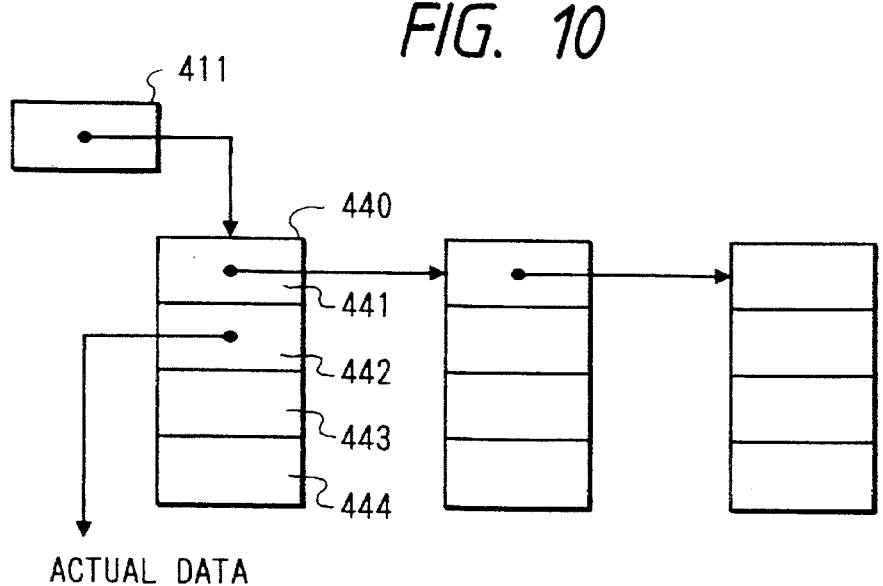
FIG. 10 is a structural diagram of satisfied information data of intra-data condition for actual data.

The evaluation 101 in FIG. 1 is configured as shown in FIG. 4. Actual data which satisfies every condition 402 of a condition string 401 which can be judged within one actual data is stored in α memories 411, 412, and 413 which are satisfied information of each intra-data condition evaluation. FIG. 10 shows the data structure of each α memory. A memory cell 440 for managing actual data is composed of a pointer 441 to the next actual data memory cell, a pointer 442 to actual data, priority criterion information 443, and group identification information 444. Combined actual data is generated from each of the α memories 411, 412, and 413 which configure rules by the combined actual data generator 102 and the generated combined actual data is judged by the inter-data condition evaluation for actual data 103 as to whether the inter-data condition for actual data is satisfied. When the inter-data condition evaluation for actual data 103 is not satisfied by the combined actual data given by the generator 102, the next combined actual data is requested for the generator 102. When the condition evaluation 103 is satisfied by the combined actual data given by the generator 102, the combined actual data given is an instance to be obtained.

Next, the process of the combined actual data generator 102 will be explained in detail. This embodiment uses a conflict resolution processing method which is composed of one rule. Therefore, whatever conflict resolution strategy is designated by a user, a strategy which is effective as conflict resolution is an intra-rule conflict resolution strategy. To simplify the explanation in this embodiment, it is assumed that the rule is composed of three inter-data condition evaluations for actual data and the intra-rule strategy is {R, OR}. However, other rule structures and intra-rule strategies may be used.

Figure 11:
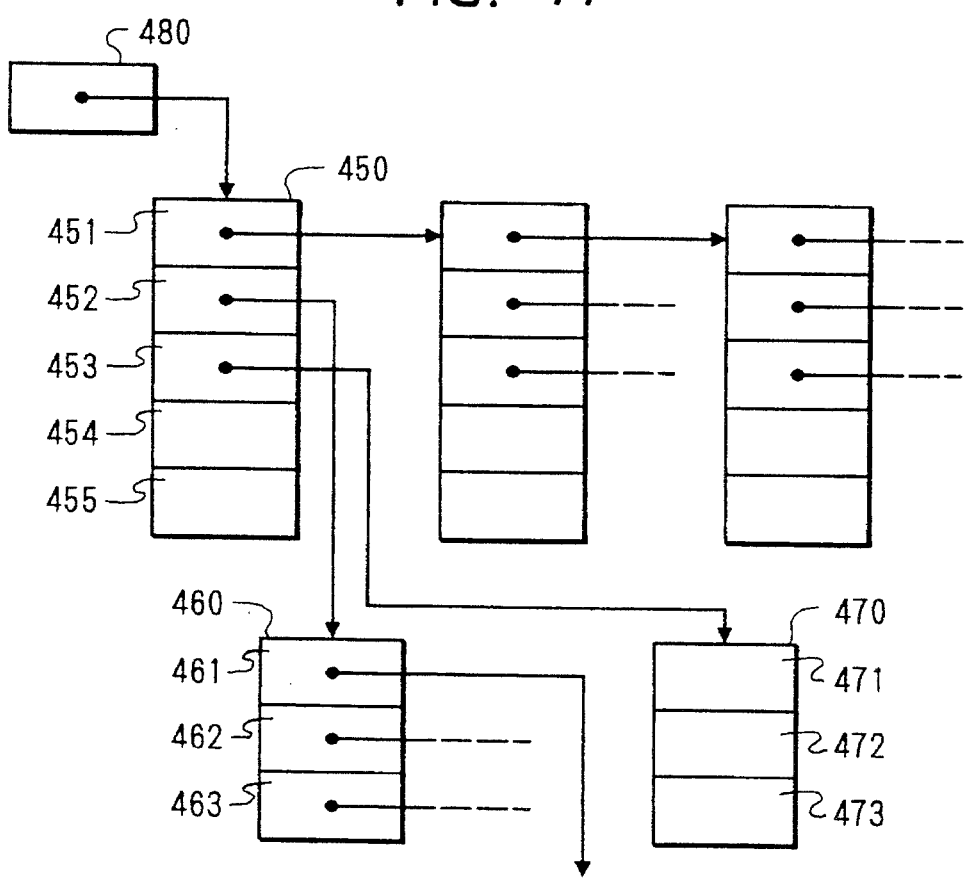
FIG. 11 is a structural diagram of actual data combination management information data.

Management information of combined data is configured as shown in FIG. 11. A combined data management pointer 480 is a pointer to a combined data management memory cell 450. The combined data management memory cell 450 is composed of a pointer 451 to the combined data management memory cell, a pointer 452 to the actual data pointer memory cell, a pointer 453 to the priority criterion information memory cell, transition data position information 454, and group identification information 455. An actual data pointer memory cell 460 is composed of pointers 461, 462, and 463 to actual data management memory cells 440 stored in the memories. A priority criterion information memory cell 470 is composed of actual data priority criterion informations 471, 472, and 473.

Figure 16:
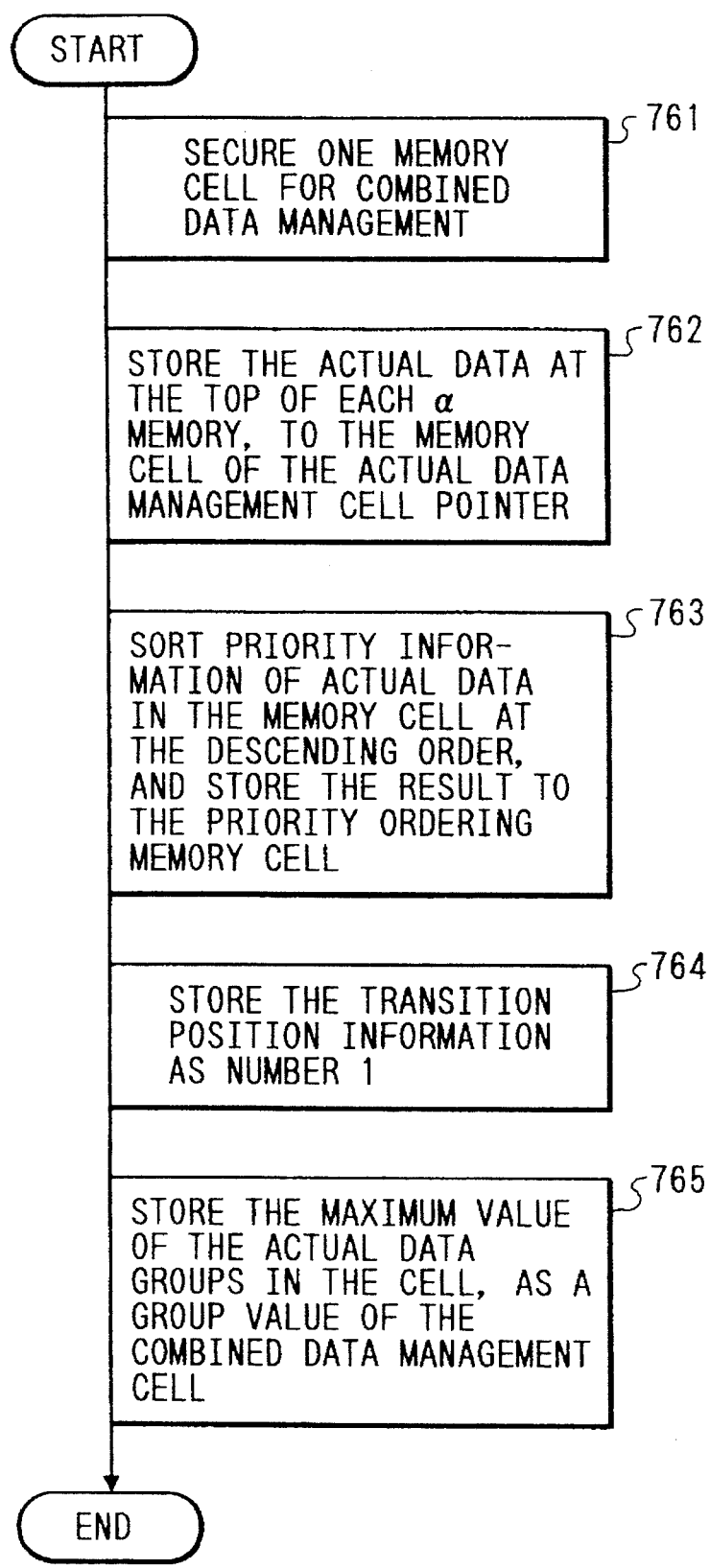
FIG. 16 is a flow chart of the generation process of newly obtained combined actual data.
Figure 17:
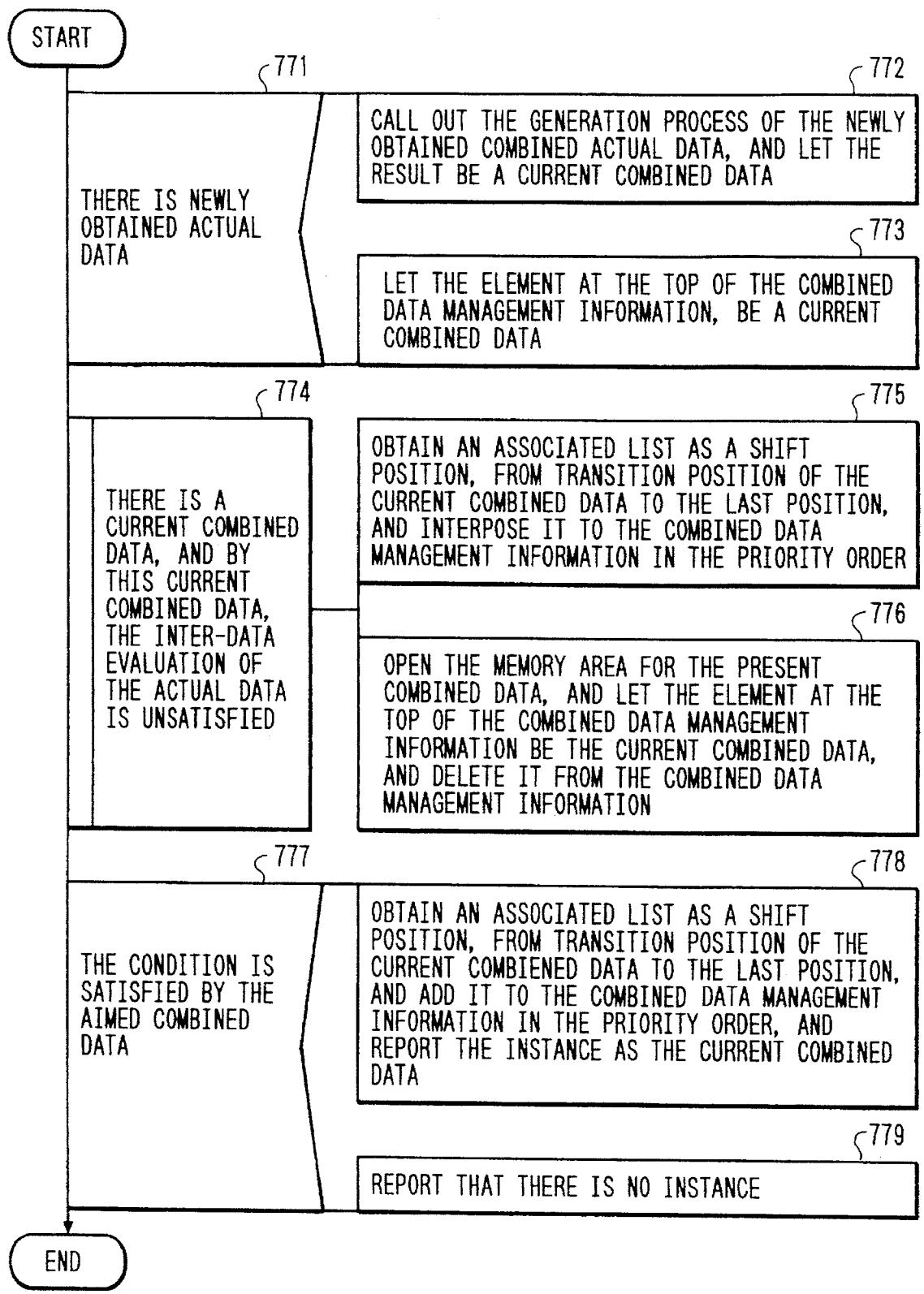
FIG. 17 is a flow chart of inter-data condition evaluation for actual data.

FIG. 17 is a flow chart of the inter-actual data condition evaluation process. FIG. 17 will be explained using an example of the inter-data condition evaluation for actual data from the initial state. As shown in FIG. 6, it is assumed that the initial state is such that actual data having priorities of 7, 2, and 1 are registered in the α memory 411, and actual data having priorities of 5 and 3 are registered in the α memory 412, and actual data having priorities of 6, 4, and 0 are registered in the α memory 413. Actual data registered in the α memories are lined up in the reverse order of the registration order. Therefore, changed actual data is interposed at the base of the list. The initial state is equal to a state that there is newly obtained data, so that a judgment process 771 is satisfied and a process 772 is executed. Details of the process 772 are shown in the flow chart in FIG. 16. One memory cell is secured by a process 761, and the data at the top of each memory is stored by a process 762, and the priority as combined data information is calculated by a process 763, and the transition position information is stored as number 1 by a process 764, and the group number as combined data information is set by a process 765. In FIG. 6, the combination of actual data is (<7>, 5, 6) and it is current data and a candidate list 421. In FIG. 6, each transition position is enclosed by <> and other information is omitted. The top of the candidate list 421 is given to the inter-data condition evaluation for actual data 103, that is, a process 774 and the condition is checked. In this case, (<7>, 5, 6) is removed from the candidate list and (<2>, 5, 6) which is derived from (<7>, 5, 6) by changing the first data, (7, <3>, 6) which is obtained by changing the second data, and (7, 5, <4>) which is obtained by changing the third data are registered in the candidate list in the priority order by a process 775 when the condition is not satisfied or by a process 778 via a process 777 when the condition is satisfied and a candidate list 422 is obtained.

Figure 15:
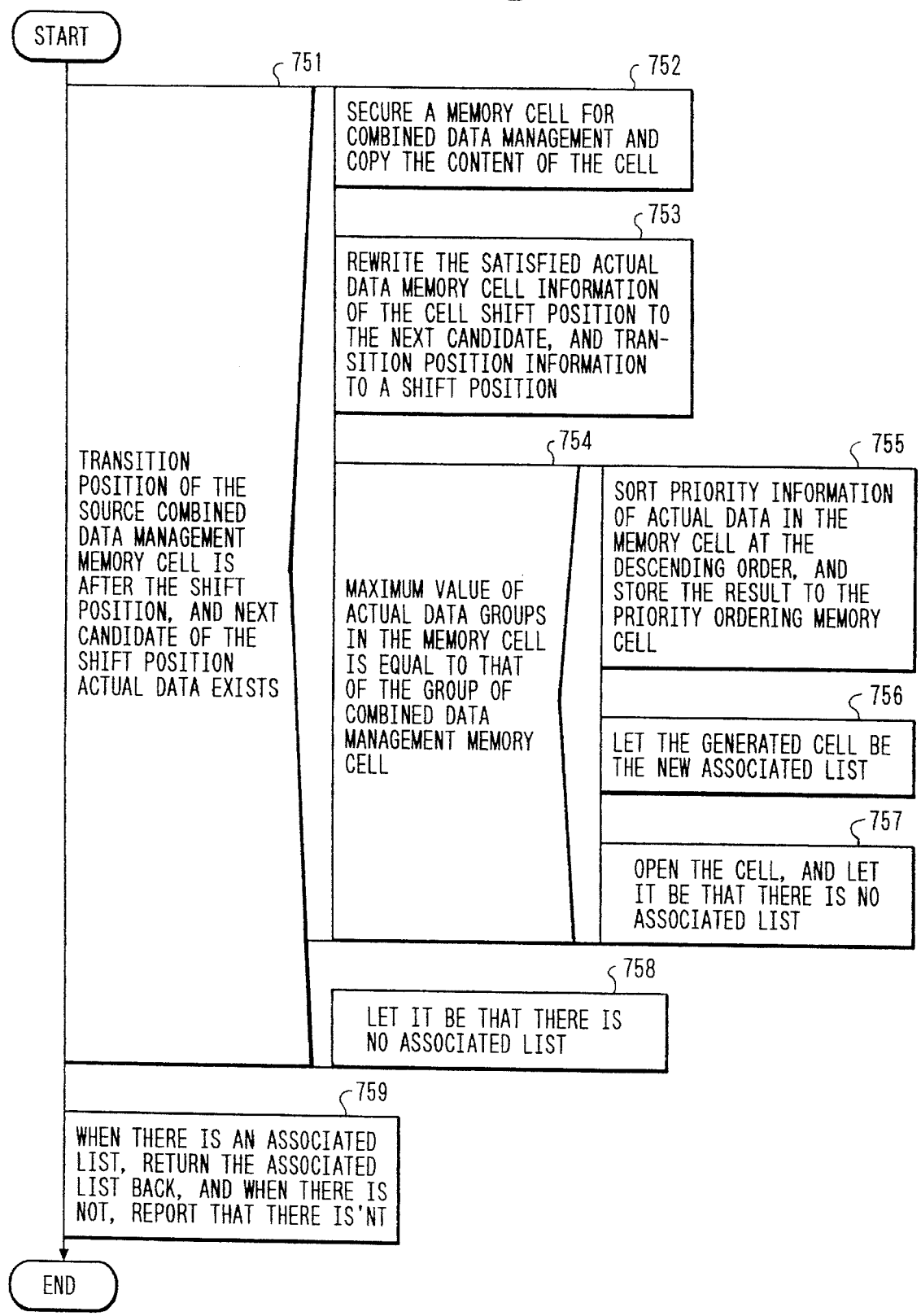
FIG. 15 is a flow chart of next candidate calculation of combined actual data.

The candidate list is obtained by changing one of the terminals on the right by the process 775 or 778, including the transition position (enclosed by <>) of an element which is a derivation source when it is derived. Therefore, a combination which is derived from (<7>, 5, 6) is obtained by changing the 1st, 2nd, or 3rd terminal. The detailed derivation is shown in the flow chart in FIG. 15. (<2>, 5, 6) is obtained by processes 751, 752, 753, 754, 755, 756, and 759. (7, <3>, 6) and (7, 5, <4>) are also obtained. In the case of derivation from (7, <5>, 6), (7, <3>, 6) or (7, 5, <4>) is obtained by changing the 2nd or 3rd terminal.

Assuming that the condition of a combination of (7, <5>, 6) is not satisfied, the top (7, <3>, 6) of the candidate list 422 is given to the inter-data condition evaluation for actual data 103 by a process 776 and the condition is checked. In this case, when (7, <3>, 6) is removed from the candidate list and (7, 3, <4>) which is derived from (7, <3>, 6) is registered in the candidate list in the priority order, a candidate list 423 is obtained. In the same way, combined actual data is given to the inter-data condition evaluation for actual data 103 one by one and the condition is checked. FIG. 6 shows the status up to a candidate list 425 when the condition for the top element (7, 3, <4>) of the candidate list 424 is satisfied. When obtaining a new instance with this status kept unchanged, the subsequent process is continued by a process 773 via a process 771 using the top element of the combined data management information as current data.

Figure 7:
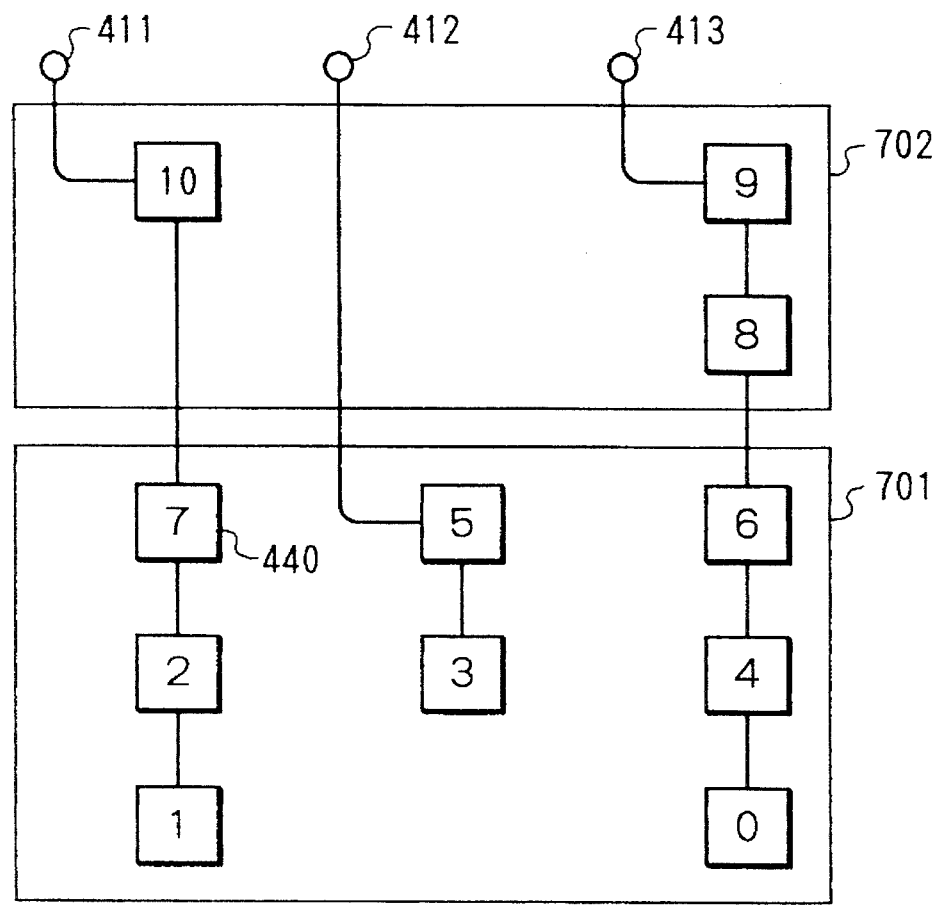
FIG. 7 is a state diagram of the combined actual data generator shown in FIG. 4 when new actual data is obtained.

Next, the evaluation process when new actual data is obtained will be explained. When the rule is in the last status shown in FIG. 6, assuming that actual data with a priority of 10 is newly given to the α memory 411 and actual data with priorities 9 and 8 are newly given to the α memory 413, the evaluation process will be explained with reference to FIG. 7.

The group number of actual data 701 which is already registered in each α memory is set to 0 and the group number of actual data 702 which is newly registered is set to 1. The candidate lists which are already derived are derived by the actual data of only the group 0, so that each of them is expressed by adding 0 to the list string so as to indicate that it belongs to the derivation group 0. When a list which is derived by newly obtained actual data is expressed adding 1 to the list string so as to indicate that it belongs to the derivation group 1, a candidate list 431 is obtained.

The derivation group of a candidate list is equal to a largest group among the groups to which the actual data contained in a derivation source element belongs. Therefore, (7, 5, <6>) which is derived from (7, 5, <8>) by a process 757 is not added to the candidate list because a candidate of group 0 is derived from group 1.

Figure 8:
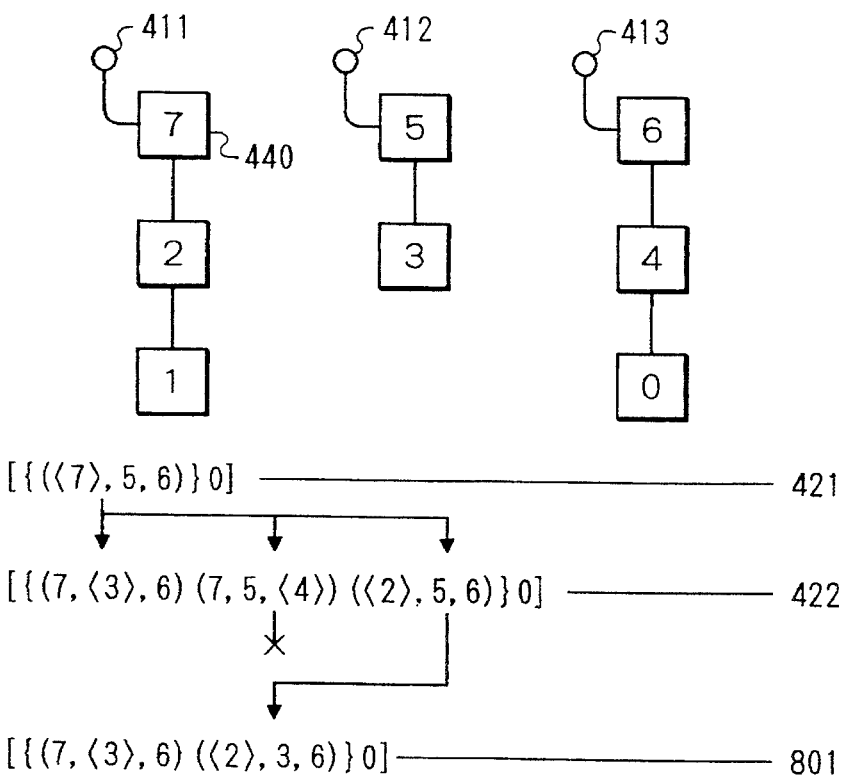
FIG. 8 is a state diagram of the combined actual data generator shown in FIG. 4 when actual data is deleted.
Figure 18:
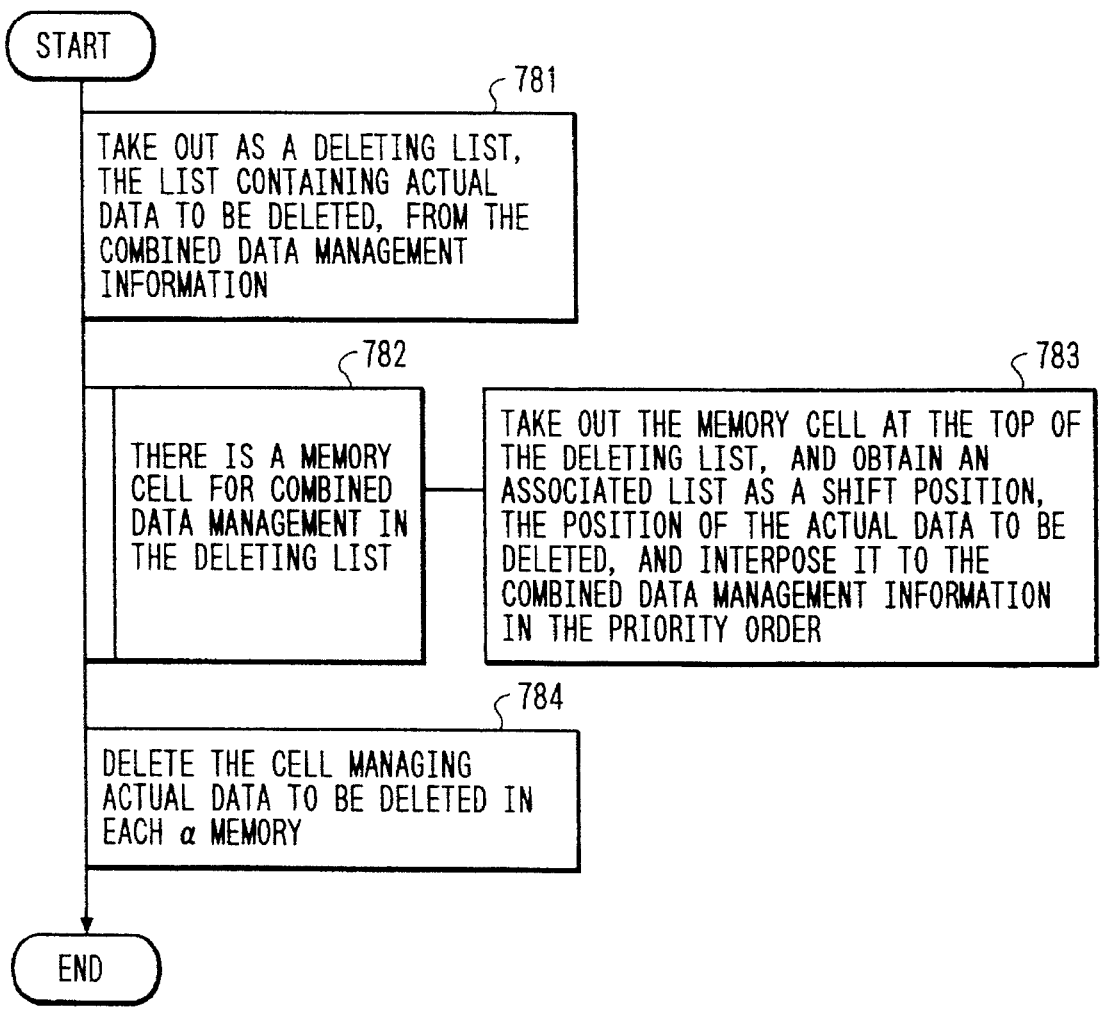
FIG. 18 is a flow chart of actual data deletion.

Next, deletion of actual data will be explained. FIG. 18 is a flow chart of deletion of actual data. It is assumed that the rule is in the status shown in FIG. 8, and the condition is satisfied by a candidate list of (<7>, 5, 6), and the candidate list is in the status of 422. Deletion of actual data 5 in this state will be explained. Firstly, candidates containing the actual data 5 are extracted from the candidate list 422 by a process 781 and candidates wherein one of the terminals of the actual data 5 is changed are derived by processes 782 and 783. In this example, (7, 5, <4>) and (<2>, 5, 6) are target combinations. However, no candidate is derived for (7, 5, <4>) by processes 751 and 758 because the terminal to be changed is on the left of the derivation reference terminal. Therefore, only (<2>, 3, 6) which is derived from (<2>, 5, 6) is added to the candidate list. When the candidate list derivation ends and the actual data 5 is deleted from the α memory 412 by a process 784, the actual data deletion process is finished.

Next, the evaluation process when actual data is updated will be explained. When actual data is updated, the information on the current actual data is deleted and then the evaluation process is performed on the assumption that new actual data is obtained.

The evaluation process can be performed in the conflict resolution strategy order without the combined actual data, which is already checked by the aforementioned process, being stored.

According to this embodiment, the evaluation process can be performed with no conflict set being obtained, and a useless evaluation process can be reduced, and the evaluation process can be continued without the combined actual data, which is already checked, being stored, and also the storage area can be reduced.

Figure 9:
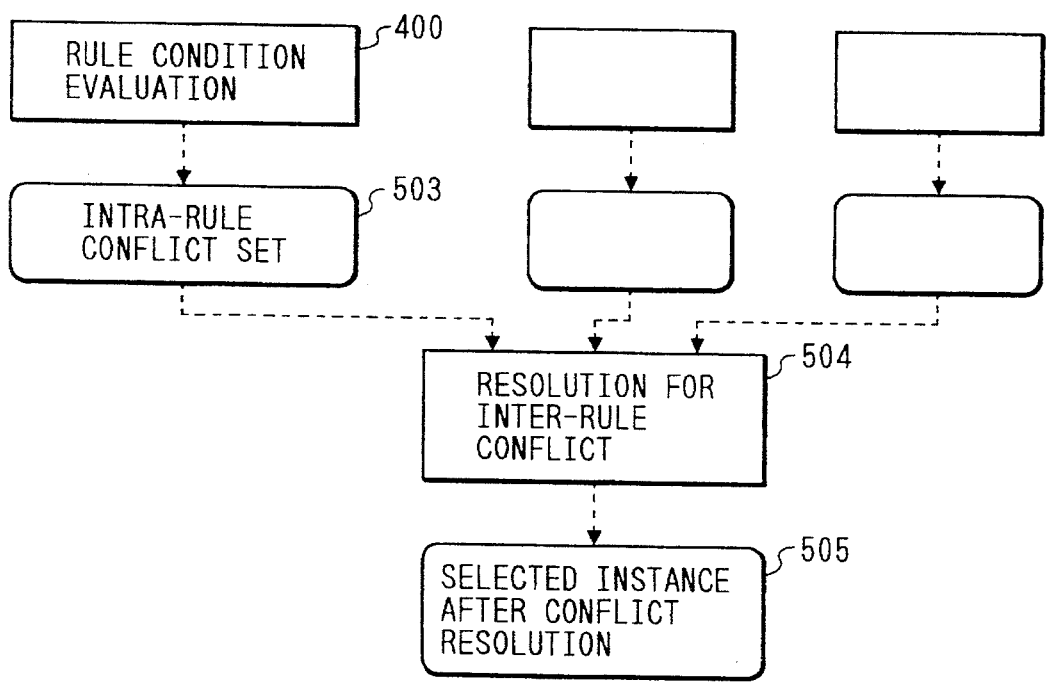
FIG. 9 is a block diagram of the rule condition evaluation process wherein the process up to obtaining of the intra-rule conflict set shown in FIG. 5 is replaced with the rule condition evaluation shown in FIG. 4.

The evaluation processing method on the basis of a conflict resolution strategy consisting of one rule and the conflict resolution processing method for splitting and managing a conflict set may be combined. Therefore, as shown in FIG. 9, the process up to obtaining of the intra-rule conflict set 503 shown in FIG. 5 may be replaced with the rule condition evaluation shown in FIG. 4.

According to the present invention, the degree of freedom of conflict resolution strategies which can be designated by a user can be improved and the efficiency of the conflict resolution process can be increased by cutting redundant strategies. The number of combinations of conflict sets to be compared is reduced and the efficient of the conflict resolution process is increased. The evaluation process can be performed with no conflict set being obtained, and a useless evaluation process can be reduced, and the evaluation process can be continued without the combined actual data, which are already checked, being stored, and also the storage area can be reduced.

What is claimed is:

1. A processing method for a production system comprising a rule base for storing rules, each rule having a condition part and conclusion part, an actual database for storing fact data, and a processor, the processing method comprising the steps of:

a) designating (i) at least a rule, (ii) fact data to be combined with the designated rule, and (iii) a conflict resolution strategy for resolving conflicts between instantiations obtained by combining said fact data and said at least a rule;

b) with said processor, combining the condition part of said at least a rule with said designated fact data, in an order given by said conflict resolution strategy, to generate at least an instantiation;

c) stopping the combining process performed in the combining step at a first success in the combining process; and d) with said processor, executing the conclusion part corresponding to the instantiation corresponding to the first success.

2. A processing method for a production system according to claim 1, further comprising the step of:

obtaining said conflict resolution strategy by combining a plurality of conflict resolution basic strategies prior to the designating step.

3. A processing method for a production system according to claim 2, wherein steps (a), (b), and (d), are performed by an inference engine.

4. A production system according to claim 1, wherein the rules in said rule base are given priority and said conflict resolution strategy selects combinations of said rules and fact data in a prioritized order.

5. A production system comprising:

a rule base for storing rules, each rule consisting of a condition part and conclusion part; an actual database for storing fact data; and an inference engine, wherein said inference engine comprising:

means for designating rules, fact data to be combined with each designated rule, and at least a conflict resolution strategy for resolving conflicts between instantiations obtained by combining said rules with said fact data;

means for combining a condition part of each designated rule, with said fact data in an order given by said conflict resolution strategy to generate instantiations;

means for stopping the combining means in response to a first success, such that a first success instantiation is generated; and means or executing the rule conclusion part of corresponding to the first success instantiation.

6. A production system comprising:

a rule base for storing rules, each rule having a condition part and a conclusion part;

an actual database for storing fact data;

a processor;

means for designating individual ones of the rules, fact data to be combined with the designated rule, and at least a conflict resolution strategy for resolving conflicts between instantiations obtained by combining said designated rule with said fact data;

means for suppressing generation of instantiations which have no possibility of succeeding in a combination of each designated rule and the designated fact data, based upon said designated conflict resolution strategy;

means for combining with said processor (i) the condition part of at least another designated rule other than the rules associated with the suppressed instantiations with (ii) said fact data, based upon said conflict resolution strategy, to generate at least another instantiation;

means for generating the another instantiation as an instantiation to be executed, in response to the combining by the combining means succeeding; and means for executing through said processor, a conclusion part corresponding to the generated instantiation.

7. A processing method for a production system comprising a rule base for storing rules having conditions and conclusions, an actual database for storing fact data, and a processor, the processing method comprising the steps of:

designating a plurality of the rules, fact data to be combined with the designated rules, and at least a conflict resolution strategy for resolving conflicts between instantiations obtained by combining said of rules with said fact data;

checking, through said processor, whether a condition part of each of said designated rules meets with one of the designated fact data;

storing the designated fact data, when the fact data meets with the checked rule;

generating through said processor, a combination of the stored fact data to said plurality of rules, in accordance with an order given by the designated conflict resolution strategy;

checking the fact data in said combination, in inter-rule conditions of said rules;

stopping the checking of the fact data, at a first success of said checking process;

generating an instantiation corresponding to the first success, as an instantiation to be executed; and executing through said processor, a conclusion part corresponding to the generated instantiation.

8. A production system comprising:

a rule base for storing rules, each rule having a condition part and a conclusion part;

an actual database for storing fact data;

a processor;

means for designating a subset of the rules, fact data to be combined with the designated subset of the rules, and at least a conflict resolution strategy for resolving conflicts between instantiations obtained by combining said subset of the rules with said fact data;

means for checking, through said processor, whether the condition part of each rule of said designated subset of the rules meets with one of the designated fact data;

means for storing the one of the designated fact data, when the one of the designated fact data meets with the checked rule;

means for generating through said processor, a combination of the stored fact data to said subset of the rules, in accordance with an order given by the designated conflict resolution strategy;

means for checking the fact data in said combination in accordance with inter-rule conditions of said rules;

means for stopping the checking means at a first success of said checking of the fact data;

means for generating an instantiation of the first success, as an instantiation to be executed; and means for executing through said processor, a conclusion part of the generated instantiation.

9. A processing method for a productions system comprising a rule base for storing rules having condition parts and conclusion parts, an actual database for storing fact data, and a processor, comprising the steps of:

designating at least one of the rules, fact data to be combined with each designated rule, and at least a conflict resolution strategy for resolving conflicts between instantiations obtained by combining each designated rule with said fact data;

suppressing generation of instantiations which have no possibility of succeeding in combination of each designated rule and the fact data, based upon said a conflict resolution strategy;

combining through said processor the condition part of at least another rule other than the rules associated with the suppressed instantiations with said fact data, based upon said conflict resolution strategy, to generate at least an instantiation;

generating the at least an instantiation, as an instantiation to be executed, when the combining in the combining step has succeeded; and executing through said processor, the conclusion part of the generated instantiation.

* * * * *